UNITED STATES PATENT OFFICE.

ARNOLD SCHEDLER, OF BASEL, SWITZERLAND, ASSIGNOR TO SOCIETY OF CHEMICAL INDUSTRY IN BASLE, OF BASEL, SWITZERLAND.

ORANGE TO RED TETRAZO DYE AND PROCESS OF MAKING SAME.

936,367.

Specification of Letters Patent. Patented Oct. 12, 1909.

No Drawing. Application filed July 7, 1909. Serial No. 506,275.

*To all whom it may concern:*

Be it known that I, ARNOLD SCHEDLER, chemist and doctor of philosophy, a citizen of the Swiss Republic and resident of Basel, Switzerland, have invented new and useful Orange to Red Tetrazo Dyestuffs and a Process of Making Same, of which the following is a full, clear, and exact specification.

I have found that new valuable tetrazo dyestuffs adapted to be further diazotized either in mass or on the fiber are obtained by combining either two molecular proportions of an amido-aryl-3-methyl-5-pyrazolone or of an amido-aryl-5-pyrazolone-3-carboxylic acid, or, in any order, one molecular proportion of one of these compounds and one molecular proportion of another suitable azo-dyestuff component, with a tetrazo-compound derived from a diamin of the general constitution

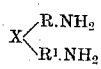

in which X represents—

O, S, $-CH=CH-$, $-NH.CO-$, $-N=N-$,

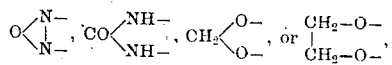

and R R' represents the same or different aryl residues; examples of such diamins are a diamidodiphenyl ether, a thioanilin, an azoanilin, an azoxy-anilin, para-amidophenolethylene ether, a para-para-diamido-diphenylureadisulfonic acid, meta-amidobenzoyl-meta-phenylenediamin. The dyestuffs thus obtained form, in dry state, brownish-yellow to brown powders and dye cotton orange-yellow to red tints which when diazotized on the fiber and subsequently developed with suitable azo-dyestuff components, as for instance methylphenylpyrazolone or β-naphthol, are transformed into fiery reddish yellow and orange to blue red tints of excellent fastness to washing.

Example 1: 6,4 parts of meta-azoxy-toluidin (made from para-nitro-ortho-toluidin) are dissolved in 100 parts of hot water with addition of 15 parts of hydrochloric acid of 30 per cent. strength and the solution is cooled to 0° C. The solution is next diazotized with 3,6 parts of sodium nitrite and the tetrazo-solution is run into an ice-cold solution of 11 parts of meta-amidophenol-5-pyrazolone-3-carboxylic acid and 20 parts of calcined sodium carbonate. The formation of dyestuff is complete after a short time, whereupon the yellow product which has separated is filtered off and dried. It dyes cotton directly reddish yellow tints which pass to a clear orange when diazotized on the fiber and subsequently developed with β-naphthol, the dyeings being excellently fast to washing. By substituting phenyl-methyl-pyrazolone for the β-naphthol, a clear reddish yellow fast to washing is obtained.

Example 2: 3,14 parts of para-amidophenol-ethylene ether (hydrochlorid),

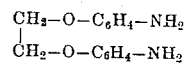

are dissolved in about 50 parts of hot water, the cooled solution is mixed with 5 parts of hydrochloric acid of 30 per cent. strength and then diazotized by means of 1,4 parts of sodium nitrite. The tetrazo-solution thus obtained is run into a solution of 4,8 parts of meta-amido-phenyl-5-pyrazolone-3-carboxylic acid and 8 parts of calcined sodium carbonate in about 100 parts of water. When the combination is complete the dyestuff is worked up in the usual manner. It dyes cotton without a mordant yellow tinged orange tints, which when diazotized and developed with β-naphthol pass to a red orange fast to washing.

Example 3: 4 parts of para-para-diamido-diphenyl-urea-meta-meta-disulfonic acid are dissolved in 50 parts of water with addition of the necessary quantity of sodium carbonate; after cooling to 5°–10° C. the solution is diazotized by means of 8 parts of hydrochloric acid and 1,4 parts of sodium nitrite. The tetrazo-solution is then stirred into a solution of 4 parts of meta-amidophenyl-3-methyl-5-pyrazolone made alkaline with sodium carbonate. The dyestuff, isolated by salting out and filtering, dyes cotton yellow orange. The dyeings developed with β-naphthol exhibit a red orange tint of great clarity and excellent fastness to washing.

Example 4: For the urea-derivative used in the preceding example is substituted the equivalent quantity (4,14 parts) of para-para-diamidostilbene-ortho-ortho-disulfonic acid. There is thus obtained a dyestuff which dyes cotton directly yellow red, the dyeings developed with β-naphthol being clear blue-red.

Example 5: The tetrazo-solution made in the usual manner from 5,7 parts of meta-azoxyanilin is neutralized with sodium carbonate and mixed with an ice-cold solution of 8 parts of 2:5-amino-naphthol-1:7-disulfonic acid and 20 parts of calcined sodium carbonate. When the formation of the intermediate product is complete, a solution of 5,5 parts of meta-amino-phenyl-5-pyrazolone-3-carboxylic acid is added and the mixture is stirred for some time; the mass is then warmed and the dyestuff salted out. It dyes cotton yellow orange tints which, when developed with β-naphthol pass to a clear deep scarlet.

In an analogous manner dyestuffs may be made from other diamins included in the aforesaid definition. Instead of the first component named in Example 5 another azo-dyestuff component may be used; particularly suitable are those which contain an amido-aryl residue adapted to be diazotized, such as amido-benzoyl-amidonaphtholsulfonic acids or amidoaryl-1:2-naphthimidazole-5-oxy-7-sulfonic acids.

What I claim is:

1. The herein described process for the manufacture of orange to red tetrazo-dyestuffs, which consists in combining one molecule of the tetrazo-derivative of a diamin of the general formula:

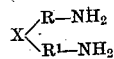

with two molecules of azo-dye-components, one at least of which is a molecule of an amidoaryl-5-pyrazolone-derivative.

2. As new products, the tetrazo-dyestuffs which are obtained by combination of one molecule of the tetrazo-derivative of a diamin of the general formula

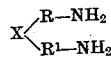

with two molecules of an azo-dye-component, one at least of which is a molecule of an amidoaryl-5-pyrazolone-derivative, forming in dry state brownish-yellow to brown powders soluble in water with orange to red coloration and dyeing unmordanted cotton orange-yellow to orange-red shades which, when further diazotized and developed with beta-naphthol, yield valuable orange to red tints fast to washing.

In witness whereof I have hereunto signed my name this 25th day of June 1909, in the presence of two subscribing witnesses.

ARNOLD SCHEDLER.

Witnesses:
GEORGE GIFFORD,
AMAND BRAUN.